US012703404B2

(12) United States Patent
Sève et al.

(10) Patent No.: US 12,703,404 B2
(45) Date of Patent: Aug. 11, 2026

(54) CABLE TRANSPORTATION INSTALLATION WITH IMPROVED SAFETY, METHOD FOR DETECTING AN EVENT ON A CABLE AND METHOD FOR MANUFACTURING ONE SUCH INSTALLATION

(71) Applicant: POMA, Voreppe (FR)

(72) Inventors: Clémence Sève, Saint Laurent du Pont (FR); Pierre Bonomini, Voiron (FR); Gilles Billet, Voiron (FR)

(73) Assignee: POMA, Voreppe (FR)

( * ) Notice: Subject to any disclaimer, the term of this patent is extended or adjusted under 35 U.S.C. 154(b) by 1132 days.

(21) Appl. No.: 17/569,045

(22) Filed: Jan. 5, 2022

(65) Prior Publication Data

US 2022/0227400 A1 Jul. 21, 2022

(30) Foreign Application Priority Data

Jan. 15, 2021 (FR) ...................................... 2100417

(51) Int. Cl.

*B61B 12/06* (2006.01)
*B61B 7/00* (2006.01)
*B61B 12/02* (2006.01)
*B61B 12/12* (2006.01)
*G02B 6/26* (2006.01)

(52) U.S. Cl.

CPC ................ *B61B 12/06* (2013.01); *B61B 7/00* (2013.01); *B61B 12/02* (2013.01); *B61B 12/122* (2013.01); *G02B 6/264* (2013.01); *G02B 6/266* (2013.01)

(58) Field of Classification Search

CPC ......... B61B 12/06; B61B 12/02; B61B 12/12; B61B 12/122; B61B 7/00; G02B 6/264; G02B 6/266

USPC .......................................................... 104/112

See application file for complete search history.

(56) References Cited

U.S. PATENT DOCUMENTS 4,019,002 A * 4/1977 Kunczynski ............ B61B 12/06 200/61.18
4,220,095 A * 9/1980 Segafredo ............... B61B 12/06 200/61.08
2003/0145759 A1* 8/2003 Rodnunsky ............. B66C 11/16 104/180

(Continued)

FOREIGN PATENT DOCUMENTS

CH 570891 A5 12/1975
EP 0613807 B1 * 3/1999

(Continued)

*Primary Examiner* — S. Joseph Morano
*Assistant Examiner* — James William Jones
(74) *Attorney, Agent, or Firm* — Oliff PLC

(57) ABSTRACT

The cable transportation installation includes a cable supported by several sheaves of several pillars. At least one pillar is provided with at least one optical fuse defining first and second states enabling or preventing flow of an optical signal. A detection device is configured to detect derailment of the cable from one of the sheaves. The detection device makes a signal flow through the optical fuses to monitor their state. The optical fuses are configured to change state between the first state and the second state when the at least one optical fuse comes into contact with the cable or with one of its supports. The detection device emits an alarm in response to detection of a change of state of one of the optical fuses. Each optical fuse includes an optical fibre.

17 Claims, 4 Drawing Sheets

(56) References Cited

U.S. PATENT DOCUMENTS

| | | | | |
|---|---|---|---|---|
| 2005/0041936 A1* | 2/2005 | Billet | G02B 6/4226 | 385/93 |
| 2005/0128095 A1* | 6/2005 | Frazier | B61B 12/06 | 187/391 |
| 2009/0115607 A1* | 5/2009 | Beinhocker | G08B 13/126 | 340/541 |
| 2011/0073000 A1* | 3/2011 | Thum | B61B 12/06 | 104/112 |

FOREIGN PATENT DOCUMENTS

| | | | | |
|---|---|---|---|---|
| EP | 1881509 A2 * | 1/2008 | B61B 12/06 |
| FR | 2387830 A1 | 11/1978 | |
| FR | 2548612 A1 * | 1/1985 | |
| FR | 2654941 A1 | 5/1991 | |
| FR | 2946940 A1 | 12/2010 | |
| WO | WO-9721575 A1 * | 6/1997 | B61B 11/00 |
| WO | WO-2015145019 A1 * | 10/2015 | B61B 11/00 |

* cited by examiner

FIG.3a
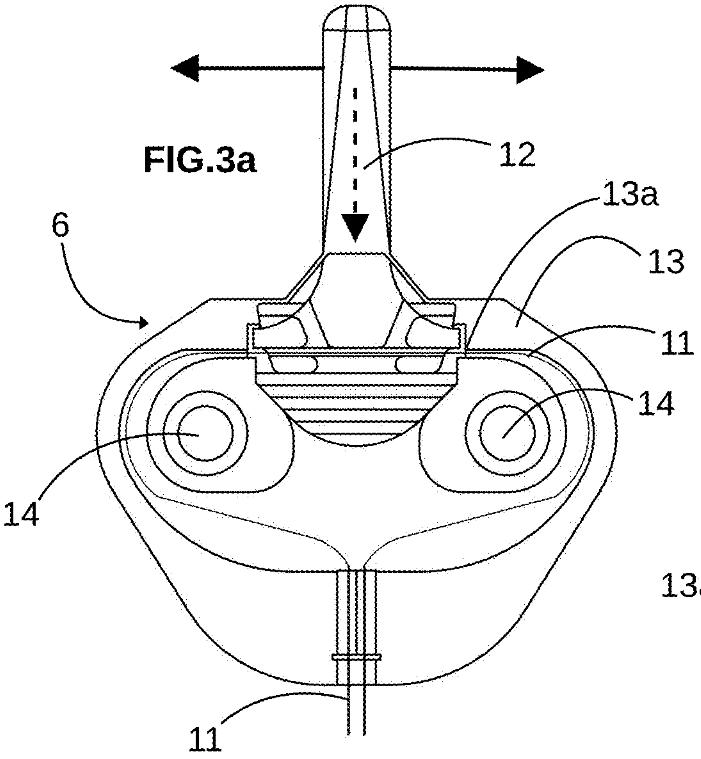
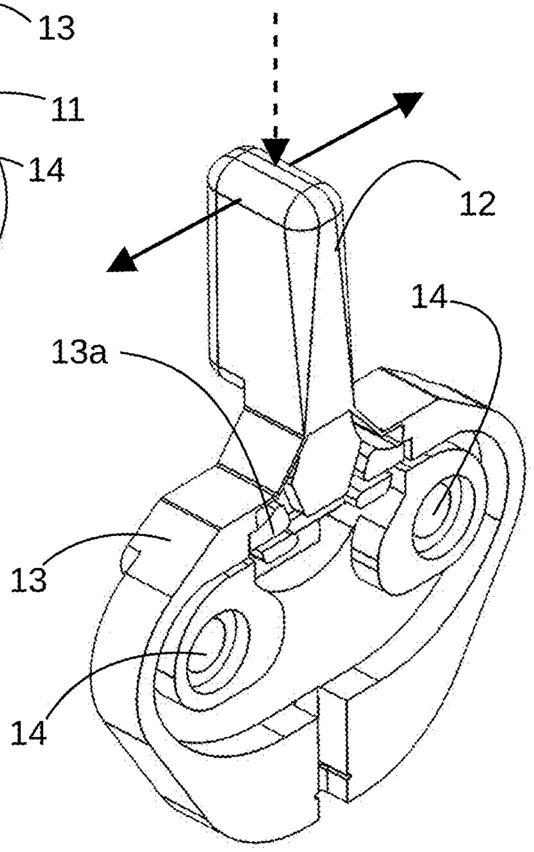
FIG.3b
FIG.4
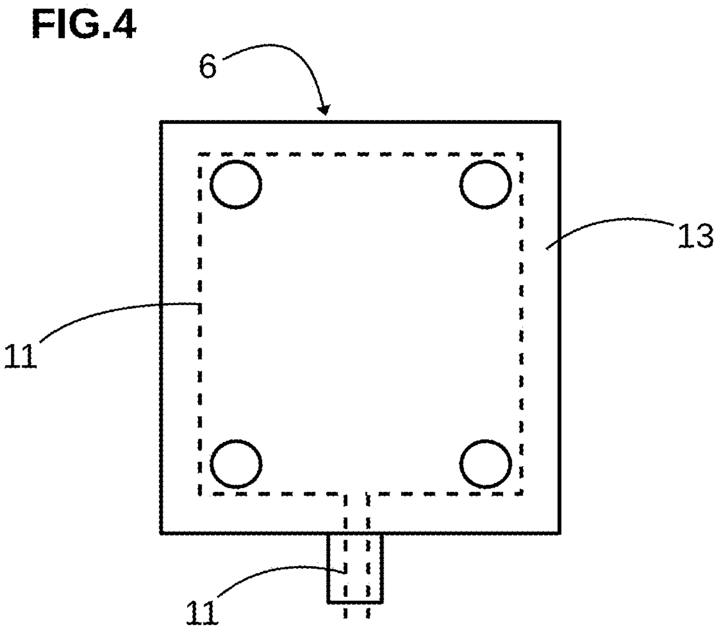

CABLE TRANSPORTATION INSTALLATION WITH IMPROVED SAFETY, METHOD FOR DETECTING AN EVENT ON A CABLE AND METHOD FOR MANUFACTURING ONE SUCH INSTALLATION

BACKGROUND OF THE INVENTION

The invention relates to a cable transportation installation, to a method for detecting an event on a cable and to a method for manufacturing one such installation.

STATE OF THE ART

Cable transportation installations conventionally comprise one or more cables that support and move cars. The cables are kept in place by means of a plurality of sheaves arranged along the cableway.

The cable may exceptionally escape from the groove of the sheave possibly resulting in the cable falling. It is particularly important to be able to detect movement of the cable coming out of the groove and the location of the pillar associated with this event. It is known from the document FR2548612 to connect one or more electrical safety lines with the cableway, interruption of which lines, in particular in case of a cable derailment, resulting in shutdown of the installation. In the document FR2548612, the safety line comprises at least one electrically conducting breakable strip that is located close to a cable guide sheave and is designed to be broken by the cable fall. The cable fall thus results in interruption of the safety line and shutdown of the installation.

However the electrical performances of the electrical lines undergo considerable modifications with temperature and more generally with the weather conditions so that the electrical performances of the detection system are subject to changes. An inhomogeneous modification of the electrical performances of the electrical lines by ageing is also observed. The detection system may also generate fleeting faults that are at least partially linked to connection of the detectors on the electric power line connecting the latter to the central control circuit. This results in this solution not being satisfactory. To reduce the risks of nuisance tripping, it is known to install a second electrical circuit connected in parallel with the first electrical circuit with a second breakable strip fitted just next to the first strip. There again, this solution is not satisfactory as it increases the costs associated with detection of a cable event and the complexity of the installation.

It is known from the document FR2946940 to install electrical circuits connecting the different pillars with a control circuit. There are more electrical circuits than tested pillars. The electrical circuits comprise one or more fuse elements that are installed on the pillars to detect a derailment. The absence of an electrical signal flowing in the two adjacent electrical lines makes it possible to determine which pillar has suffered a derailment.

It is also apparent that the conductors of the electrical circuit do not all age at the same rate as they are located at different altitudes and are subjected to different weather conditions (wind and sun). This results in the solution proposed in the document FR2946940 not being completely satisfactory.

OBJECT OF THE INVENTION

One object of the invention consists in providing a cable transportation installation enabling an event on a cable, for example a cable derailment, a lost sheave or a blocked sheave, to be detected quickly, and that makes it easier to determine which pillar is associated with this incident. For this purpose, the cable transportation installation comprises:

- a cable,
- a plurality of pillars each provided with at least one sheave, the cable being arranged supported by the at least one sheave of the plurality of pillars, at least one pillar of the plurality of pillars being provided with at least one fuse defining a first state allowing a signal to pass and a second state preventing the signal from passing,
- a detection device configured to detect at least one cable event, the detection device making a signal flow through the at least one fuse of the plurality of pillars to monitor the state of the at least one fuse, the at least one fuse being configured to change state between the first state and the second state when the fuse detects said at least one cable event, the detection device being configured to emit an alarm in response to detection of a change of state of the at least one fuse of the plurality of pillars.

The cable transportation installation is remarkable in that the at least one fuse is an optical fuse comprising an optical fibre and in that the detection device comprises a transmitter device configured to transmit an optical signal and a receiver device configured to receive said optical signal, the transmitter device being connected to the receiver device by the at least one optical fuse.

The detection device preferentially comprises at least one optical fuse configured to change state when said at least one optical fuse is mechanically stressed by the cable.

According to one development of the invention, the at least one optical fuse is configured to cut the optical fibre when the at least one optical fuse is mechanically stressed by the cable.

In advantageous manner, the at least one optical fuse is configured to cut the optical fibre by shearing when the at least one optical fuse is mechanically stressed by the cable.

According to another development, the at least one optical fuse comprises a pin fitted in movable manner to cut the optical fibre loop when the pin is mechanically stressed by the cable. The at least one optical fuse comprises a body defining a cavity and an optical fibre loop, the optical fibre loop being fitted inside the cavity around two attachment points separated by the pin. The at least one optical fuse is configured to detect derailment of the cable by means of the pin.

Advantageously, the optical fibre loop passes through the pin along a first axis and more preferentially the pin is fitted movable in rotation around an axis of rotation perpendicular to the first axis and at a distance from the first axis to sever the optical fibre loop.

In preferential manner, said at least one cable event is an event chosen from derailment of the cable from at least one of said sheaves, loss of at least one of said sheaves, or blocking of at least one of said sheaves.

In preferential manner, each pillar comprises a catcher designed to receive the cable that has escaped from the at least one sheave. The at least one optical fuse is salient from the catcher so as to be struck by the cable and to detect a cable derailment. As an alternative, the catcher has a movable part connected to the optical fuse so as to mechanically stress the optical fuse when the movable part is struck by the cable.

In a particular embodiment, mechanical stressing of the at least one optical fuse by the cable is achieved by a direct contact made by the at least one optical fuse with the cable and severing of the at least one optical fuse by the cable.

In another preferential embodiment, the detection device comprises at least one optical fuse arranged to detect a sheave loss or a blocked sheave, the at least one optical fuse being functionally connected to a sheave assembly of the plurality of pillars to change state when the sheave assembly rotates beyond a threshold value.

Advantageously, several optical fuses of the plurality of optical fuses are placed in series on an optical line and are designed so that the optical signal can flow through the latter. Each at least one optical fuse of the several optical fuses is initially in the first state. The detection device comprises a determination device configured to determine the position of an optical fuse in the second state among the several optical fuses connected in series when a cable event has been detected.

Preferentially, the determination device is configured to calculate the transit time of the emitted optical signal reflected by the severed optical fibre to determine the position of the optical fuse in the second state.

In a particular embodiment, the several optical fuses are each connected in the optical line by means of a connector introducing at least one disturbance and the determination device is configured to calculate the number of disturbances undergone by the optical signal to determine the position of the optical fuse in the second state.

It is also advantageous to provide for each pillar to comprise:

- a control box supplied with electricity and connected to the control circuit via an optical line,
- a plurality of optical fuses connected to the control box, the control box containing the transmitter device and the receiver device.

It is a further object of the invention to provide a detection method that detects a cable event efficiently.

This object tends to be achieved by means of a method for detecting a cable event in a cable transportation installation comprising at least the following steps:

- providing a cable transportation installation comprising a cable, a plurality of pillars each provided with at least one sheave, the cable being arranged supported by the at least one sheave of the plurality of pillars, at least one pillar of the plurality of pillars being provided with at least one fuse defining a first state allowing a signal to pass and a second state preventing the signal from passing, the at least one fuse being configured to change state between the first state and the second state when the at least one fuse detects an event on the cable;
- regularly transmitting a signal passing through the fuse;
- detecting absence of receipt of said signal by a signal receiver device and deducing therefrom a change of state of the at least one fuse representative of an event on the cable.

The method is remarkable in that the at least one fuse is an optical fuse that comprises an optical fibre, in that the signal is an optical signal designed to pass through the optical fuse, and in that the receiver device is an optical receiver device.

Preferentially, each optical fuse belongs to an optical connector, the optical connectors being connected in series along the optical fibre. Each optical connector introduces a disturbance of the optical signal when the optical signal passes through the optical connector. The method comprises a countdown of the number of disturbances of the optical signal received to determine the number of optical connectors passed through and to evaluate the position of the optical fuse that changed state.

In advantageous manner, the optical fuses are connected in series along the optical fibre. Each group of two consecutive optical fuses along the optical fibre is separated by a threshold distance, the threshold distance corresponding to the minimum distance that exists along the optical fibre between two optical fuses and that enables a distinction to be made by a measuring device of the optical signal, determination of the optical fuse that changed state being performed by calculating the time taken to receive the signal reflected by the fuse that changed state.

It is yet a further object of the invention to provide a method for manufacturing a cable transportation installation that is easy to implement and more efficient than the configurations of the prior art.

This result tends to be achieved by means of a method for manufacturing a cable transportation installation that comprises the following steps:

- providing a cable transportation installation comprising a cable, and a plurality of pillars each provided with at least one sheave, the cable being arranged supported by the at least one sheave of the plurality of pillars, at least one pillar of the plurality of pillars being provided with at least one electric fuse defining a first state allowing an electrical signal to pass and a second state preventing the electrical signal from passing, the at least one fuse being configured to change state between the first state and the second state when the at least one electric fuse is mechanically stressed by the cable, the at least one electric fuse being connected to a detection circuit by an electrically conducting cable;
- replacing the electric fuse by an optical fuse, the optical fuse defining a first state enabling an optical signal to pass and a second state preventing the optical signal from passing, the at least one optical fuse being configured to change state between the first state and the second state when the at least one optical fuse detects an event on the cable;
- connecting the at least one optical fuse to the detection circuit via an optical line.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which:

FIGS. 3*a* and 3*b* schematically represent a front view and a perspective view of an optical fuse with the path of the optical fibre or without an optical fibre, with a movable pin designed to sever the optical fibre;

FIG. 4 schematically represents another embodiment of an optical fuse with the path of the optical fibre in a dashed line, the optical fibre being designed to be severed by the cable;

DESCRIPTION OF THE EMBODIMENTS

Figure 1:
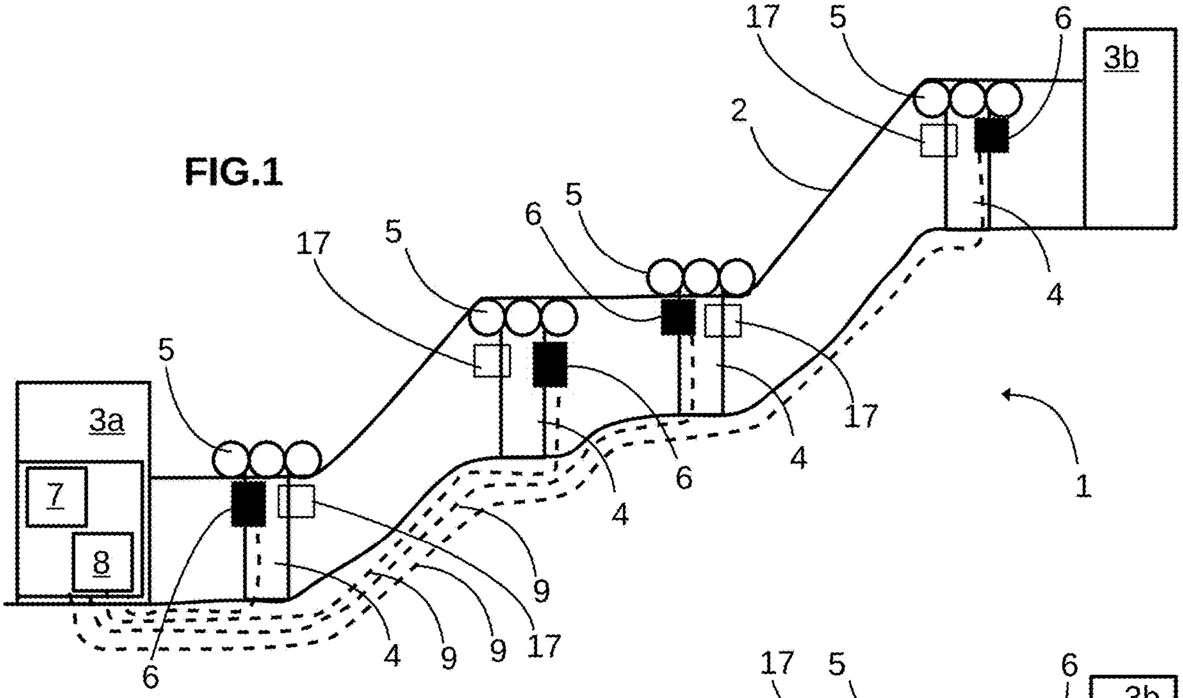
FIG. 1 schematically illustrates a first embodiment of an installation with a specific optical line connecting each pillar provided with at least one optical fuse.
Figure 2:
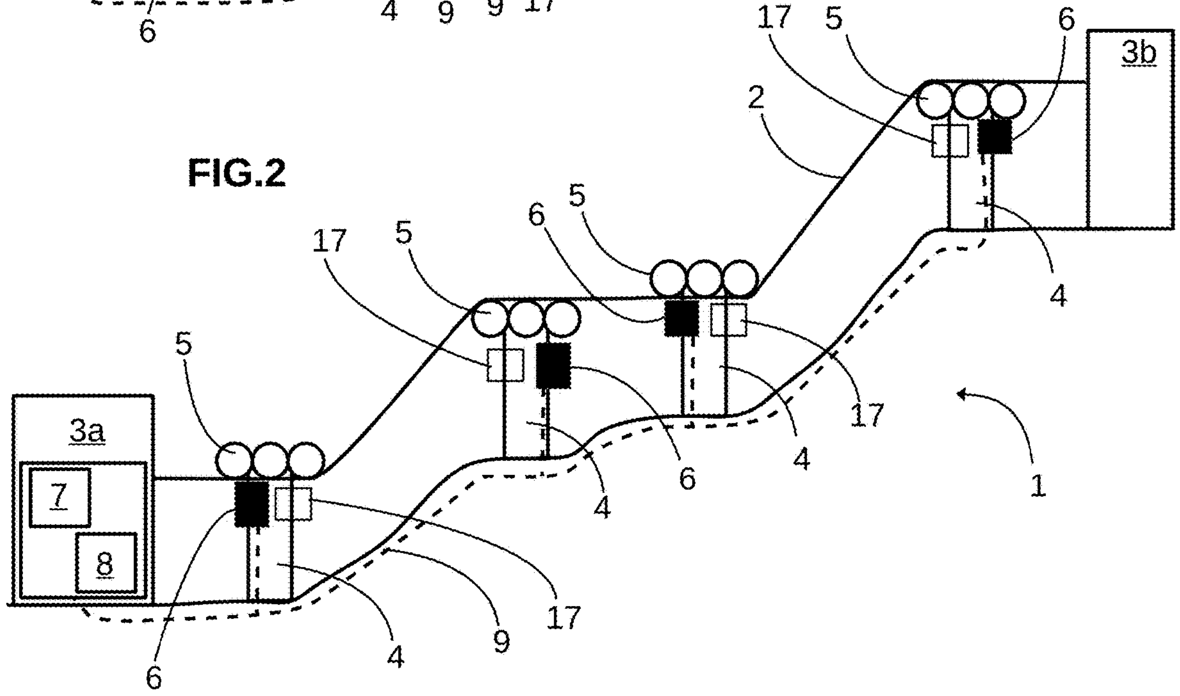
FIG. 2 schematically represents a second embodiment of an installation with an optical line connecting all the pillars provided with at least one optical fuse.

An embodiment of a cable transportation installation 1 has been represented in FIGS. 1 and 2. Installation 1 comprises an aerial cable 2 connecting two terminals 3*a* and 3*b*. Aerial cable 2 can be only a hauling cable, only a carrying cable or a carrying-hauling cable. A cable 2 that is only a hauling cable is designed to haul one or more cars without being able to support the weight of the car, a cable 2 that is only a carrying cable is configured to carry the car or cars without being able to haul the car or cars. A carrying-hauling cable is designed to support the weight of the car and to haul the latter between two terminals 3*a* and 3*b*.

The cable transportation installation can be an installation for transporting people or goods. The installation can comprise a terminal or a plurality of terminals also called stations.

Installation 1 can be of any type, for example monocable as illustrated in FIG. 1, or bicable, with fixed or detachable grips, with a continuous or back-and-forth cable. A monocable installation comprises a single cable that is both carrying and hauling, a bicable installation comprises at least one hauling cable and at least one carrying cable. A fixed grip installation comprises cars that are attached in permanent manner to the hauling cable, a detachable grip installation comprises cars attached in removable manner to the hauling cable. A continuous cable installation comprises a hauling cable that describes a closed loop between two terminal stations of the installation and the cars run continuously along the hauling cable. A back-and-forth installation comprises a car that performs a back and forth run between two terminal stations along one and the same track.

In the particular embodiment illustrated in FIGS. 1 and 2, installation 1 comprises two terminal stations 3*a* and 3*b* or loading/unloading stations for loading and unloading people or goods in and from the cars (not shown). Installation 1 further comprises a drive station 3*a*/3*b* provided with a motor to drive a bull-wheel to move hauling cable 2. Installation 1 can comprise a return station 3*b*/3*a* comprising a return pulley for tensioning hauling cable 2. In advantageous manner, the cars are coupled to hauling cable 2. It is preferable for the cable to be located above the cars and above the ground. However, an installation where the cars are hauled by a cable located under the cars is also conceivable, for example for cars running on rails and/or wheels.

Each car of installation 1 comprises an attachment device to attach the car to hauling cable 2. The attachment device can be a fixed or detachable grip.

It is particularly advantageous to use a carrying-hauling cable.

Installation 1 also comprises one or more structures 4 where cable 2 runs. Structure 4 is a vertical structure serving the purpose of supporting cable 2. Structure 4 can be a line pillar, i.e. a pillar located between loading and/or unloading stations.

A line pillar 4 can perform support, compression, or horizontal deviation of the hauling cable. Structure 4 can also be an internal support structure located in a terminal station 3*a*,3*b* or an intermediate station (not shown) and also called internal support pillar. Cable 2 defines a path connecting stations 3*a*,3*b* to one another.

In general manner, structure 4 comprises at least one sheave 5, preferably a plurality of sheaves 5. A sheave is a wheel provided with a groove designed to receive cable 2. Whatever the configuration, cable 2 presses on sheave 5. Sheave 5 is mounted rotatable around a main axis of rotation. The main axis of rotation is advantageously a horizontal axis, i.e. sheave 5 is a compression or a support sheave, and the car can move up or down.

To detect an incident relating to the cable also called cable event or event on cable 2, installation 1 is provided with a detection device configured to detect movement of cable 2 outside its normal position, for example a cable derailment, and also an incident on one of the sheaves associated with cable 2, for example blocking of a sheave 5 and/or loss of a sheave 5 on a pillar 4. Derailment of cable 2 corresponds to a cable 2 that slips out of a groove of at least one sheave 5, i.e. that leaves its predefined position. Depending on the particular cases, cable 2 can either fall or move upwards to be preferentially caught by a catcher or it can be jammed laterally by a flange-plate (not illustrated). Loss of a sheave 5 corresponds to a sheave 5 coming adrift whereas blocking of a sheave 5 corresponds to a sheave 5 that is no longer able to rotate to follow the running of cable 2. The pillar can be a line pillar or a station pillar.

To detect an event on a cable 2, it is particularly advantageous for at least one pillar 4 and preferentially several pillars 4 to be provided with at least one fuse element which is an optical fuse 6. Preferentially, each pillar 4 is provided with at least one optical fuse 6 arranged to detect a configuration corresponding to an event on a cable 2, for example an event chosen from a derailment for at least one sheave, a loss of sheave 5 and a blocking of rotation of a sheave 5. More preferentially, pillar 4 comprises several optical fuses 6 configured to detect several different cable event configurations among the above-mentioned events. For example, pillar 4 has at least one optical fuse 6 configured to detect a derailment of cable 2, at least one optical fuse 6 configured to detect a loss of sheave 5 and at least one optical fuse 6 configured to detect a blocking of sheave 5.

The optical fuse is configured to change state between the first state and the second state when the at least one fuse 6 is mechanically stressed by cable 2. The first state allows the optical signal to pass whereas the second state blocks the signal.

Optical fuse or fuses 6 are connected to a transmitter device 7 configured to transmit a signal designed to pass through one or more optical fuses 6 to reach a receiver device 8 configured to receive a signal that has passed through one or more optical fuses 6.

In order to gain in efficiency, optical fuse 6 comprises at least one optical fibre 11 the optical attenuation value of which varies according to the state of optical fuse 6.

The prior art configuration uses an electrically conducting wire, for example a copper wire, the electrical performances of which vary greatly with temperature and ageing. The optical performances of optical fibre 11 are less dependent on the climatic conditions and in particular on the temperature. It is also apparent that the optical fibre is not electrically conducting which makes the detection device insensitive or less sensitive to lightning. Furthermore, the connections between optical fuse 6 and the rest of the optical circuit present a performance/cost ratio that is more favourable than its electrical equivalent. This results in less nuisance tripping of optical fuses than of electric fuses.

As the attenuation of optical fibre 11 is low, it is easier to detect an absence of signal and therefore a change of state of optical fuse 6 even over a long distance.

In particularly advantageous manner, when the installation is in operation, optical fuse 6 is configured to be in the first state, i.e. to allow the optical signal to pass. This configuration makes it possible to detect a change of state of optical fuse 6, malfunctioning of optical fuse 6 and malfunctioning of transmitter device 7. Optical fuse 6 switches to the state that prevents the optical signal from passing between transmitter device 7 and receiver device 8 when optical fuse 6 detects an event on a cable 2.

Optical fuse 6 is designed to operate in difficult environments, i.e. it may be subjected to low temperatures, rain, ice, or sunlight which will make the electronic components age and/or distort measurements. It is therefore particularly advantageous to use an optical fuse 6 that is simpler to manufacture. For the same reasons, it is particularly advantageous to use an optical fuse 6 that is passive, i.e. devoid of electric power supply in order to avoid having to supply optical fuse 6 with electricity. It is also advantageous to use an optical fuse that is electrically insulating making installation of the optical fuse on a pillar that is conventionally made from metal easier to perform.

Transmitter device 7 transmits an optical signal that has to pass through optical fuse 6 to reach receiver device 8. When receiver device 8 detects an absence of optical signal, it deduces that the cable has suffered an event considered as being dangerous and sends an alarm. Transmission of the alarm can be associated with shutdown of the installation, for example shutdown of the drive motor of cable 2. Transmitter device 7 preferably transmits an optical signal regularly. It is advantageous for transmitter device 7 to transmit several optical signals per second.

In one configuration, optical fuse 6 can be reset, i.e. when the operation is performed on the pillar to inspect the derailment, an action enables the optical fuse to be switched to its initial state.

In a particular embodiment, optical fuse 6 is a non-resettable fuse, i.e. an optical fuse 6 that only accepts one change of state. Preferentially, optical fuse 6 is configured to only switch from a first state allowing the optical signal to pass to a second state not letting the signal pass once an event such as a derailment has occurred. This configuration ensures that detection of an incident will necessarily be followed by an operation on the pillar to perform action on the optical fuse. For example, optical fuse 6 can be configured to be a single-use fuse so that tripping of the latter necessarily requires replacement of optical fuse 6.

As optical fuse 6 is designed to operate in an aggressive environment, it is particularly advantageous for optical fuse 6 to be rugged while at the same time being able to detect the incident and to cut off communication. It is advantageous for optical fuse 6 not to be supplied with electricity. It is also advantageous for optical fuse 6 not to be provided with a movable mirror and/or a spring.

In order to obtain reliable detection of an event on a cable, for example a derailment of cable 2 with respect to a sheave 5 of pillar 4, a plurality of optical fuses 6 are fitted along the cable routing circuit on each pillar 4.

In a particular configuration illustrated in FIG. 1, each pillar 4 is associated with a specific optical line 9. In other words, an optical line 9 only comprises or is only associated with a single pillar 4. Optical line 9 can have a transmitter device 7 and a receiver device 8 that are specific thereto, but it is advantageous to pool these devices in order to monitor several optical lines. A transmitter device 7 transmits optical signals for several pillars 4 via several different optical lines. A receiver device 8 receives optical signals from several pillars 4 via the multiple optical lines 9. Receiver device 8 is able to identify the faulty pillar.

When an event on a cable 2 occurs on a pillar 4, receiver device 8 no longer receives a signal from the associated optical line 9 which makes it possible to determine the faulty pillar 4 quickly. In such a configuration, it is particularly advantageous to connect optical fuses 6 in series in order to be able to quickly detect optical fuse 6 in the off state and therefore evaluate the position of the event and/or the type of event.

When optical fuse 6 is in off state, the end of optical fibre 11 fitted in the optical fuse appears as a fault, for example a fault that reflects a part of the transmitted signal. By using an optical impulse reflection or reflectometry device, it is possible to analyse the reflected light with respect to the transmitted light and to determine faults and attenuations and also their distances. It is then possible to determine the exact position of the faulty fuse on pillar 4 and potentially the type of event.

It is advantageous for the multiple optical fuses 6 of a pillar to be connected in series on a dedicated optical line 9. In a variant, the multiple optical fuses of pillar 4 are star-connected and are connected to a dispatching device 17 that provides an optical signal for each optical fuse 6 and retrieves the optical signal from each optical fuse 6. This variant is less advantageous as it requires the use of a dispatching device 17 that has to be supplied with electricity.

As the optical attenuation of optical fibres varies little with time, it is preferable to use the particular configuration illustrated in FIG. 2 where the multiple optical fuses 6 of installation 1 are connected in series. The same signal passes through the multiple optical fuses until an event on cable 2 occurs. A single optical line 9 connects transmitter device 7 and receiver device 8 and connects the multiple optical fuses 6 in series. A single optical line connects all the pillars 4 thereby forming a compact and dependable detection device.

By using an optical impulse reflection or reflectometry device, it is possible to analyse the reflected light with respect to the transmitted light and to determine faults and attenuations and also their distances. It is then possible to determine the exact position of the faulty optical fuse 6 among optical fuses 6 of optical line 9 distributed on the different pillars 4.

It is further possible to combine these two embodiments by using several optical lines 9 that are each associated with one or more pillars 4. There again, it is advantageous to connect optical fuses 6 in series to detect the position of the faulty optical fuse 6 with an optical impulse reflection or reflectometry device and to avoid fitting an electricity-consuming dispatching device 17 on a pillar 4.

Different optical fuses can be fitted on a pillar 4 to detect a derailment on different sheaves. The position of optical fuses 6 with respect to sheaves 5 depends on the configuration of pillar 4. If sheave 5 is a support sheave, the latter prevents cable 2 from falling. It is then preferable to install the optical fuse underneath the expected position of the cable. If on the other hand sheave 5 is a compression sheave, the latter prevents cable 2 from moving upwards and it is preferable to install the optical fuse above the expected position of cable 2. In order to detect that the cable has escaped from the groove of a sheave in a direction that does not result in the cable falling, for example a lateral shifting of cable 2 up against a flange-plate, it is preferable to place an optical fuse 6 outside the axis corresponding to the normal position of the cable. In this way, when the cable leaves its position, it stresses optical fuse 6 mechanically for example by coming into contact with optical fuse 6 which trips optical fuse 6. In this particular case, the optical fuse can be sheared by the cable which will sever the optical fibre. In an alternative embodiment, cable 2 that slips out of sheave 5 places a load on a member that moves to mechanically stress optical fuse 6. Cable 2 coming out of the groove stresses optical fuse 6 by means of an intermediate part. When cable 2 mechanically stresses the intermediate part, for example when it strikes the intermediate part, the latter mechanically stresses optical fuse 6 and causes a change of state.

To detect a derailment corresponding to a cable coming out of a groove of a sheave 5 more easily, it is preferable for each pillar 4 to comprise a catcher 10, i.e. a support designed to receive cable 2 that has escaped from sheave 5. Support 10 at least partially guides the cable that escaped from sheave 5 to define its path and to facilitate contact of the latter with optical fuse 6 or an intermediate part actuating the optical fuse.

Figure 5:
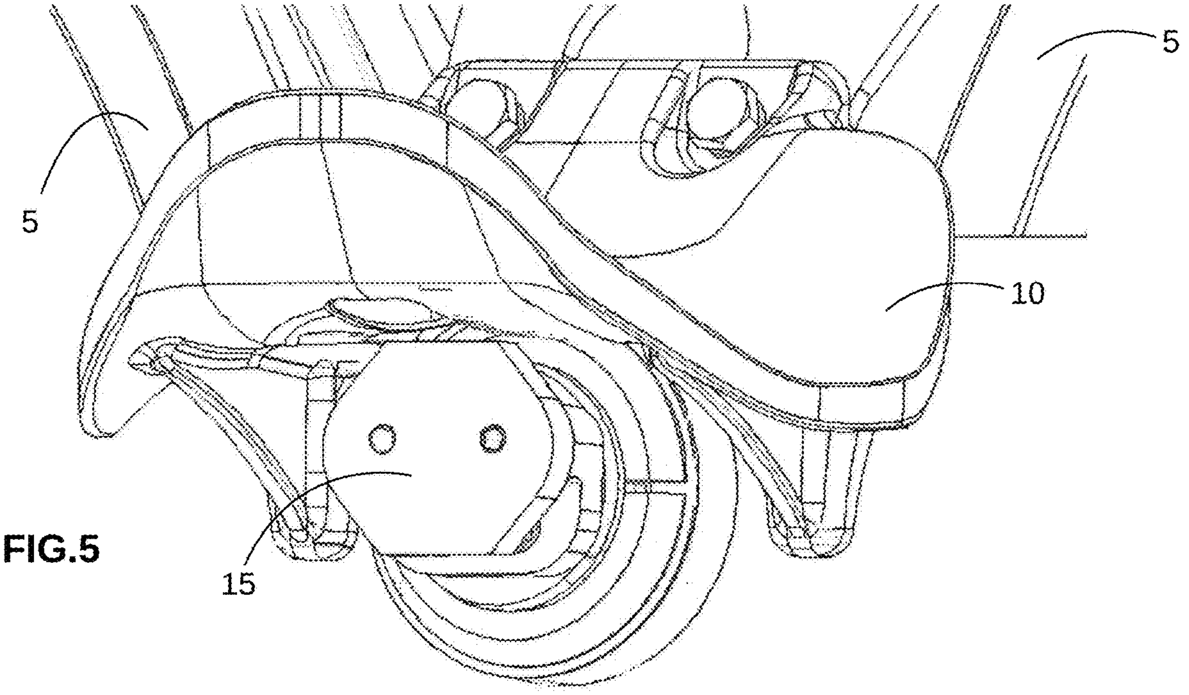
FIG. 5 schematically represents a catcher mounted on a pillar with support sheaves, FIG. 6 schematically represents a catcher mounted on a pillar with compression sheaves, FIG. 7 schematically represents a pillar head with a plurality of optical fuses.
Figure 6:
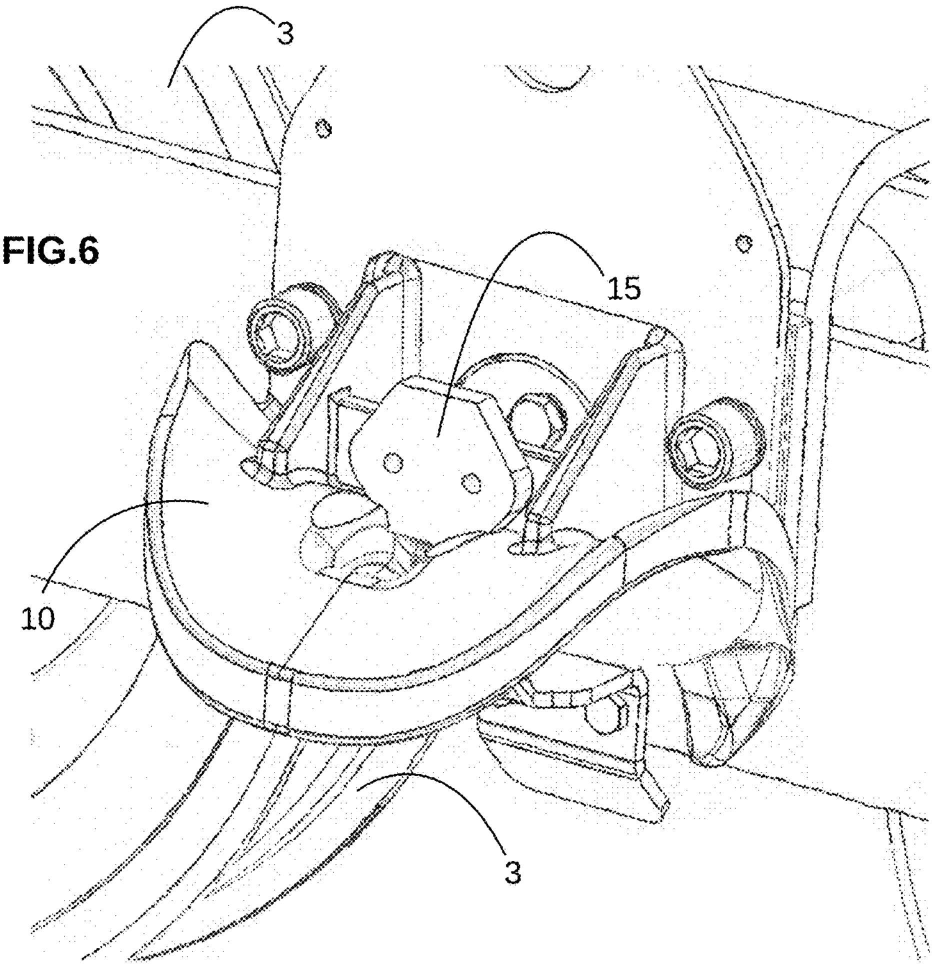

FIGS. 5 and 6 illustrate two embodiments of catchers 10 fitted so as to retrieve a cable 2 escaping from a support sheave (FIG. 5) and a compression sheave (FIG. 6). Catcher 10 can be of any shape provided that it enables the path of cable 2 that derailed to be better mastered to facilitate detection of the derailment.

Optical fuse 6 is arranged to detect cable 2 escaping from the associated sheave 5 or the associated sheaves and preferentially to detect that it has fallen onto catcher 10. Optical fuse 6 is configured to switch from a state allowing the signal to pass to a state preventing the signal from passing when optical fuse 6 is struck by cable 2 that slides on catcher 10. Optical fuse 6 is arranged at a distance from the groove and preferably at a distance from sheave 5.

Figure 7:
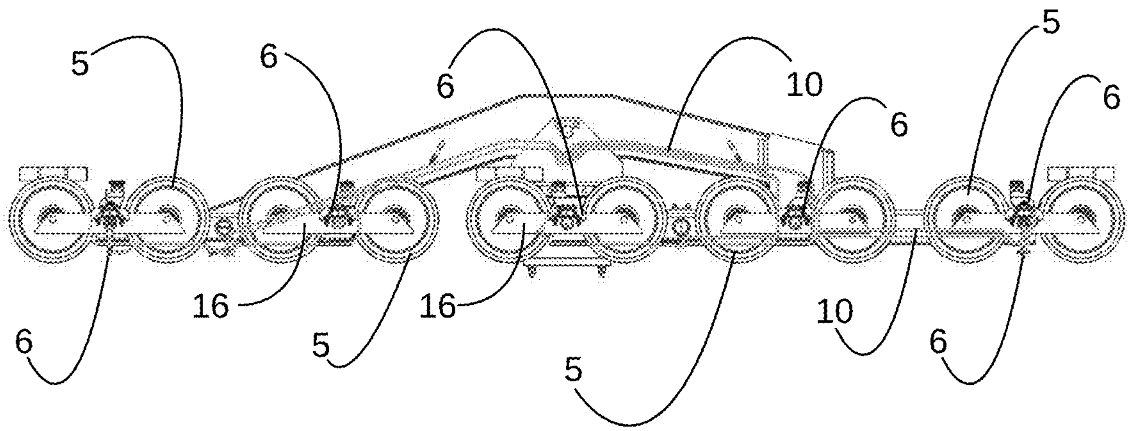

As illustrated in FIG. 7, optical fuse 6 is preferably mounted fixed on pillar 4 and more preferentially mounted fixed on the sheave assembly 16 of pillar 4. Several sheaves 5 are assembled on the sheave assembly 16. Pillar 4 advantageously comprises at least one sheave assembly 16, for example a primary sheave assembly 16 mounted pivotally on the support structure of the pillar, or a primary sheave assembly 16 mounted pivotally on the support structure and one or more secondary sheave assemblies 16 mounted pivotally with respect to the primary sheave assembly 16. An optical fuse 6 can be fitted so as to detect swivelling of the primary sheave assembly 16 with respect to the support structure beyond a threshold value. An optical fuse 6 can be fitted so as to detect swivelling of the secondary sheave assembly 16 with respect to the primary sheave assembly 16 beyond a threshold value.

Preferentially, optical fuse 6 is salient from catcher 10. When cable 2 escapes from the groove of sheave 5, cable 2 moves until it reaches a catcher 10, for example a U-shaped catcher 10. When cable 2 is in contact with catcher 10, it slides until it reaches optical fuse 6. Once cable 2 has come into contact with optical fuse 6, it deforms optical fuse 6 resulting in the change of state.

In another embodiment, optical fuse 6 is configured to detect another malfunctioning mode called "sheave loss". This malfunction is no longer a movement of cable 2 in a direction perpendicular to the longitudinal axis of cable 2 (axis defined by the alignment of the grooves of the sheaves), but a malfunction of a sheave 5 that moves out of its location. In this particular case, the sheave assembly 16 that comprises faulty sheave 5 becomes unbalanced which makes the sheave assembly 16 rotate beyond a threshold position. Optical fuse 6 can be configured to detect this excessive rotation of the sheave assembly 16. Rotation of the sheave assembly 16 mechanically stresses the optical fuse which changes state, for example when a threshold value is reached.

For example purposes, the sheave assembly 16 is mounted rotatable around a rotation shaft to define an axis of rotation perpendicular to the longitudinal axis of cable 2. Fuse 6 is fitted in such a way that rotation of the sheave assembly 16 following an event on a cable 2 results in displacement of fuse 6 that comes into contact with the cable. The cable runs and rubs against optical fuse 6 which cuts body 13 of optical fuse 6 and then optical fibre 11. When optical fibre 11 is cut, or once optical fibre 11 has been cut, receiving device 8 detects an attenuation of the signal or non-receipt of the optical signal and induces therefrom that an incident has occurred that can stop the drive motor of cable 2. The configuration of fuse 6 illustrating in FIG. 4 is particularly suitable. Cable 2 runs in contact with an optical fuse to sever the optical fibre. Optical fuse 6 is made from a material that is more tender than cable 2 so that contact of optical fuse 6 with cable 2 results in optical fuse 6 being sheared by cable 2 until the optical fibre is severed.

In another configuration, it is advantageous for the sheave assembly 16 not to be balanced when cable 2 is absent. It is possible to provide one sheave that is heavier than the other and/or one sheave that is further from the axis of rotation of the sheave assembly 16 than the other sheave. In this way, when cable 2 slips out from sheaves 5 without reaching catcher 10, the sheave assembly 16 swivels and changes the state of optical fuse 6 associated with the sheave assembly 16. In this particular case, if the movement of cable 2 is not compatible with coming into contact with catcher 10, rotation of the sheave assembly 16 can result in a change of state of optical fuse 6. Rotation of the sheave assembly 16 to a threshold position makes optical fuse 6 change state.

In one embodiment, an optical fuse 6 is arranged between two sheaves 5 so as to be offset from the plane comprising the side walls of the groove of the two sheaves. In this way, when cable 2 is in the grooves of the two sheaves, the cable is at a distance from the optical fuse. When cable 2 comes out of the grooves of the sheaves, it moves towards the optical fuse until it comes into contact with the latter and abrades the surface of the optical fuse resulting in the optical fibre being severed.

The installation preferentially comprises optical fuses 6 fitted removable with respect to optical line 9 for ease of performing maintenance operations. Optical fuses 6 comprise an input and an output and preferentially an internal optical fibre 11 performing transmission of the optical signal.

In a particular embodiment that is not illustrated, optical fuse 6 can comprise a mirror arranged in movable manner with respect to optical fibre 11 between a first position configured to reflect the optical signal in optical fibre 11 and a second position configured to prevent reflection of the optical signal. Optical fuse 6 comprises a pin and the position of the mirror is defined by the position of the pin. The mirror can be fitted on the pin. Optical fuse 6 is fitted on the pillar in such a way that the pin is moved by the cable when the cable leaves the groove of a sheave 5 to slide on a catcher 10. The pin is assembled movable with respect to a body 13 of the optical fuse. In another configuration, the fuse is fitted on the pillar in such a way that the pin defines the maximum authorised rotation for the sheave assembly 16. When the sheave assembly 16 becomes unbalanced and reaches the threshold position, it strikes optical fuse 6 which changes state, for example by moving the pin and the mirror. In another configuration, rotation of the sheave assembly 16 stresses optical fuse 6 mechanically, and when the rotation reaches a threshold value, the optical fuse changes state.

This technical solution makes it possible to modify the state of the optical fuse and therefore to block or let the optical signal flowing in optical fibre 11 pass depending on the position of the cable with respect to the sheave or on the position of the sheave assembly 16, which enables a derailment or another type of event to be determined. This technical solution does however appear cumbersome and costly as it requires integration of a mirror and a pin 12 both installed so as to be movable with respect to body 13 and/or with respect to optical fibre 11. The reflectivity of the mirror may also change with time on account of the climatic conditions.

In another configuration, optical fuse 6 has two portions of optical fibres that are fitted movable with respect to one another and are optically connected to one another by an optical adapter. The optical fuse also comprises a pin 12. The optical adapter is configured to ensure transit of the optical signals between the two portions of optical fibre 11 in a first state. The position of at least one of the portions of optical fibre 11 is defined with respect to the optical adapter by means of the pin. Movement of the pin results in movement of a portion of optical fibre 11 which modifies the optical coupling and therefore the attenuation of the signal. Optical fuses 6 can be installed as indicated just above to detect different events on the cable and for example different types of derailment. By detecting the change occurring in the optical coupling and therefore the attenuation introduced by optical fuse 6, it is possible to determine an event on a cable 2.

To ensure that an operation will be performed on pillar 4 that has suffered an incident, it is particularly advantageous for optical fuse 6 to be non-resettable. It is preferable for the optical fuse to be replaced after an incident. It is preferable for the optical fuse to be at least partly broken when the optical fuse detects an event, for example when cable 2 strikes optical fuse 6.

In order to provide an optical fuse 6 that is compact and rugged, it is particularly advantageous for optical fuse 6 to have few movable components and in particular for it to be configured to sever optical fibre 11 when cable 2 slips out of the groove of sheave 5 and strikes optical fuse 6. By severing optical fibre 11, flow of the optical signal is interrupted and the optical fuse is rendered non-resettable which requires a human intervention with changing of the fuse to enhance safety.

To sever optical fibre 11 inside optical fuse 6, it is particularly advantageous for optical fuse 6 to comprise an optical fibre 11 inside a body 13 and a pin 12 assembled movable with respect to body 13 and arranged to sever optical fibre 11 when the cable strikes pin 12 of optical fuse 6 and moves pin 12. Such an embodiment is illustrated in FIG. 3 and in particular in FIGS. 3*a* and 3*b*.

Pin 12 can be installed on the path of cable 2 so that pin 12 pulls on optical fibre 11 in the direction of its longitudinal axis to sever optical fibre 11 by traction by elongating the fibre beyond its breaking point. Breaking of optical fibre 11 can also be achieved by another mechanical stressing of optical fibre 11, for example by winding around an object or by torsion. However these different embodiments are not the most efficient in use for a cable transportation installation subjected to harsh climatic conditions.

In advantageous manner, pin 12 and body 13 are arranged in such a way that pin 12 severs optical fibre 11 by shearing. For example pin 12 and body 13 can form a pair of scissors that cut optical fibre 11. Pin 12 preferentially moves in a direction perpendicular to the longitudinal axis of optical fibre 11 to sever optical fibre 11. FIG. 3 illustrates, by means of two arrows, the two possible directions of movement of one end of pin 12 which makes the other end of the pin move to sever optical fibre 11 against body 13. FIG. 3 further illustrates, by means of a broken arrow, a possible movement of the pin with respect to body 13 resulting in severing of the optical fibre.

In the particular embodiment, pin 12 is fixed to body 13 by one or more connectors that are deformable or breakable. Application of a stress on pin 12 beyond a threshold value results in deformation and possibly breaking of at least one of the connectors. Pin 12 moves and severs optical fibre 11. Other modes of movement of pin 12 with respect to body 13 are possible to obtain breaking of optical fibre 11.

Pin 12 can be provided with a knife. When cable 2 comes into contact with pin 12, pin 12 moves and knife cuts optical fibre 11. Movement of pin 12 can be of any kind, for example a translation or a rotation.

In the configuration illustrated in FIG. 3, pin 12 and body 13 are configured to sever optical fibre 11 by shearing. Body 13 defines a groove 13*a* and pin 12 is arranged in groove 13*a*. Optical fibre 11 extends from a part of body 13, through pin 12 and up to the other part of body 13. Pin 12 is fitted movable with respect to body 13. When the cable comes into contact with pin 12, pin 12 moves perpendicularly to the longitudinal axis of optical fibre 11 and severs optical fibre 11. In advantageous manner, pin 12 is fitted rotatable with respect to body 13 with an axis of rotation that is perpendicular or parallel to the longitudinal axis of optical fibre 11 in the zone to be severed.

In a preferential configuration, optical fibre 11 extends in body 13 on each side of pin 12. For example body 13 defines a groove 13*a* and pin 12 is fitted in groove 13*a*. Optical fibre 11 passes through the groove passing through pin 12. Rotation of pin 12 with respect to body 13 deforms optical fibre 11 and then severs optical fibre 11. Rotation shaft of pin 12 is located at a distance from optical fibre 11.

In a particular embodiment, optical fibre 11 is installed in such a way as to define a loop of optical fibre 11 in the optical fuse. Optical fibre 11 is not installed in a straight line in the optical fuse between the input and the output, nor is it tensioned between the input and output.

In preferential manner, the optical fuse comprises a body 13 defining a cavity. The loop of optical fibre 11 is formed in the cavity. Optical fibre 11 is installed in fixed manner in the cavity by means of two grooves 13*a* that form two attachment points separated by the pin. In this way, when pin 12 is actuated, it stretches the fibre until it severs the latter.

It is advantageous for the optical fibre to be fitted free to move outside the two attachment points. It is also advantageous to provide for the optical fibre to be coated in a material that deforms to follow the deformations of the optical fibre with temperature. For example, the optical fibre can be coated in a material of elastomer type. The material is flexible to deform so as to absorb a part of the stresses that exist by differential deformation between the optical fibre and body 13. The differential thermal expansion between the optical fibre and body 13 is not sufficient to obtain breaking of the optical fibre. This configuration makes it possible to have a fibre that is free or relatively free to move inside the cavity. As optical fibre 11 is able to move with respect to body 13, the deformations of body 13 and of optical fibre 11 with temperature changes (thermal expansion) do not result in deformation of optical fibre 11 which could lead to breaking of the latter. The difference of coefficient of thermal expansion between body 13 and optical fibre 11 is not able to sever optical fibre 11, nor is it able to deform optical fibre 11.

In the embodiment illustrated in FIG. 3, the loop of optical fibre 11 passes around two salient studs 14 in the cavity. The two studs 14 also define a through hole enabling the optical fuse to be fixed to a fixing plate 15 illustrated in FIGS. 5 and 6. When the cable comes into contact with pin 12, pin 12 moves and exerts a pull on optical fibre 11 which is stretched until breaking of optical fibre 11 takes place by shearing. This optical fuse configuration enables optical fibre 11 to be efficiently severed while at the same time being economical. This solution is particularly advantageous as it is not necessary to supply the pillars with electricity as optical fuses 6 are mechanical components that change state using the energy provided by the cable to be observed.

In another configuration, each pillar comprises at least one optical fuse, a transmitter device of an optical signal and a receiver device of said signal. When a fuse switches from on state to off state, optical fibre 11 is no longer able to make the optical signal transit, for example optical fibre 11 is severed. The receiver device associated with the optical fuse in off state detects the absence of signal and provides the information to a detection circuit which identifies the pillar associated with the incident and generates an alarm. In this embodiment, the detection circuit is dissociated from the receiver device and is advantageously located in a terminal. The information is provided to the detection circuit, for example in the form of an optical signal.

It is advantageous for a first optical fuse to be located at one end of a pillar and for a second optical fuse to be located at the opposite end of the pillar along the longitudinal axis of the cable which can be its running axis. This configuration makes it possible to detect a cable coming out of the groove of a sheave at both ends of the pillar head. To detect loss or blocking of a sheave, it is advantageous to install an optical fuse on each sheave assembly 16 as illustrated in FIG. 7. Optical fuse 6 is preferentially installed to detect rocking of the sheave assembly 16 comprising the sheave or sheaves to be monitored beyond a threshold value.

To detect a cable event, transmitter device 7 of the detection device emits an optical signal that can be continuous, quasi-continuous, periodic or aperiodic. The optical signal passes through optical fuse or fuses 6 until it reaches receiver device 8 located on the same optical line 9. On receipt of the optical signal, receiver device 8 deduces therefrom that no event for example a derailment has been detected. In a particular configuration, optical line 9 defines a loop and it is then advantageous to provide for transmitter device 7 and receiver device 8 to be located in the same place and to form for example two parts of the same unit. For example, the transmitter device and second receiver are located in the drive terminal to detect an incident on all the pillars having a fuse element. In an installation with several stations, it is possible to have several transmitter devices and receiver devices so as to dissociate the observed zones in the cableway.

When an optical fuse 6 detects an event on cable 2, optical fuse 6 switches to off state and receiver device 8 deduces therefrom that an event on cable 2 has occurred. Receiver device 8 generates an alarm that can shut the drive motor of cable 2 down.

If optical line 9 comprises several optical fuses 6 connected in series, analysis of optical line 9 by optical impulse reflection or reflectometry makes it possible to determine the distance of the fault, i.e. the position of the interruption of the optical line. It is then possible to determine precisely the position of optical fuse 6, and therefore of the faulty pillar, and possibly to determine the type of event on cable 2 detected. The use of an optical signal is much more precise than that of an electrical signal.

Using an optical fuse 6 to detect an event on a cable 2, for example derailment of a cable 2 or malfunctioning of sheave 5, is particularly advantageous as the modifications to be performed on an existing installation are minimal. It is therefore possible to replace a detection device using an electrical signal by a detection device by optical signal.

An optical signal transmitter device 7 replaces an electrical signal transmitter device. An optical signal receiver device 8 replaces an electrical signal receiver device. The electrical line is replaced by the optical line comprised of optical fibre.

An optical line 9 is installed connecting optical signal transmitter device 7 with optical signal receiver device 8. At least one optical fuse is fitted along optical connection 9 to detect an event for example a cable derailment. The at least one optical fuse 6 replaces the at least one electric fuse on the plurality of pillars 4 of the installation. In advantageous manner, the multiple optical fuses 6 are all connected in series on the same optical line 9.

It is advantageous to install optical fuse 6 in an optical connector that introduces an attenuation in the optical signal. For example, at least one of the ends of optical fuse 6 introduces an attenuation of the signal. Attenuation of the signal can be low but sufficiently high to be detected.

When optical fuses 6 are connected in series and when one of optical fuses 6 changes state to indicate a malfunction, breaking of the optical line is detected and the optical signal can no longer reach the sensor. It is then advantageous to detect which optical fuse 6 changed state. A preferential manner for detecting the position of optical fuse 6 along the optical line is to use a reflectometry technique. A signal is emitted that propagates up to the optical fuse blocking the optical signal and forms a mirror. The section of the optical fibre reflects the emitted signal.

The returned signal is analysed to determine the position of the mirror and therefore the position of the optical fuse that changed state. In the first analysis mode, the returned signal received by the reflectometer is processed by a computing device, for example a computer, to determine the number of optical connectors passed through. Each optical connector introduces a disturbance. By calculating the number of disturbances, it is possible to determine the number of optical connectors passed through. It is possible to determine the position of the last optical fuse in on state and therefore the position of the next optical fuse that is in off state. As the position of the fuses along the optical line is known, it is possible to determine the position of the optical fuse before inspecting the latter and potentially to anticipate the type of malfunction.

In a second analysis mode, the returned signal received by the reflectometer is processed by a computing device, for example a computer, to determine the transit time of the optical signal. As the circulation medium of the optical signal, i.e. the optical fibre, is known, it is possible to determine the position of the mirror and therefore the position of the optical fuse that changed state. If the distance of each optical fuse with respect to the reflectometer is known, it is possible to determine which fuse changed state.

In an alternative embodiment, the optical fuses are installed in series, but the distance of optical fibre separating each group of two consecutive optical fuses is greater than a threshold distance, for example 1 metre. The threshold distance is defined by the resolution of the optical signal measuring apparatus. The threshold distance corresponds to the minimum distance that exists along the optical fibre between two events and that enables a distinction to be made by the optical signal measuring apparatus. Although an optical signal measuring apparatus is able to differentiate between two events occurring on two consecutive pillars as they are separated by several tens of metres along the optical fibre, it is more difficult to distinguish between two incidents for two fuses separated by a few centimetres on the same pillar.

It is then advantageous to always separate two optical fuses installed consecutively along the optical fibre by the threshold distance. It is also advantageous to install two optical fuses physically separated at least by the threshold distance in series along the optical fibres for ease of installation. It is also possible to install two optical fuses consecutively along the optical fibre, the two optical fuses being separated by the threshold distance along the optical fibre whereas, physically, they are not separated from one another by a distance equal to the threshold value. Determination of the optical fuse that changed state is performed by calculating the time taken to receive the signal reflected by the fuse that changed state from transmission of the optical signal designed to pass through the optical fuses.

In a particular embodiment, each optical fuse is associated with a connector that introduces an attenuation of the optical signal when the latter passes. In a particular configuration, the installation has a larger number of optical fuses than a threshold value enabling analysis of the signal to be performed by reflectometry. It is then advantageous to divide the installation into a plurality of optical lines, each optical line having an optical fibre and a smaller number of optical fuses than the threshold value. The optical fuses are connected in series.

In an advantageous embodiment, each pillar is associated with an optical fibre. Each pillar is tested independently to check correct operation of the pillar. For example, all the pillars are tested in less than 5 seconds, for example in less than 3 seconds, or in less than 2 seconds or even in less than one second. When it is detected that an optical fuse has changed state, the installation is shut down. The pillar associated with the malfunction is quickly identified as the optical fibre blocking the flow of the optical signal is identified. A complementary analysis of the optical line at the origin of the installation shutdown can then be performed, advantageously by reflectometry, to detect which optical fuse changed state on the pillar. It is then possible to determine which type of malfunction occurred.

The invention claimed is:

1. Cable transportation installation comprising:

a cable;

at least one optical fuse defining a first state allowing an optical signal to pass and a second state preventing the optical signal from passing, the at least one optical fuse being configured to change state between the first state and the second state when the at least one optical fuse detects at least one event on a cable, the at least one event on a cable corresponding to the at least one optical fuse mechanically stressed by the cable, the optical fuse comprising an optical fibre;

a plurality of pillars each provided with at least one sheave, the cable being arranged pressing on the at least one sheave of the plurality of pillars, at least one pillar of the plurality of pillars being provided with the at least one optical fuse;

a detection device configured to detect at least one event on a cable, the detection device making the optical signal flow through the at least one optical fuse to monitor the state of the at least one optical fuse, the detection device comprising a transmitter device configured to transmit an optical signal and a receiver device configured to receive said optical signal, the transmitter device being connected to the receiver device by the at least one optical fuse, the detection device being configured to emit an alarm in response to detection of a change of state of the at least one fuse, wherein the at least one optical fuse is configured to cut an optical fibre by shearing when the at least one optical fuse is mechanically stressed by the cable, and wherein the at least one optical fuse comprises a pin fitted in movable manner to sever a loop of optical fibre when the pin is mechanically stressed by the cable and wherein the at least one optical fuse comprises the loop of optical fibre and a body defining a cavity, the loop of optical fibre being fitted inside the cavity around two attachment points separated by the pin, the at least one optical fuse being configured to detect derailment of the cable by means of the pin.

2. Cable transportation installation according to claim 1, wherein the loop of optical fibre passes through the pin along a first axis.

3. Cable transportation installation according to claim 2, wherein the pin is fitted movable in rotation around an axis of rotation perpendicular to the first axis and at a distance from the first axis to sever the loop of optical fibre.

4. Cable transportation installation according to claim 1, wherein said at least one event on cable is an event chosen from derailment of the cable from at least one of said sheaves, loss of at least one of said sheaves, or blocking of at least one of said sheaves.

5. Cable transportation installation according to claim 1, wherein each pillar comprises a catcher designed to receive the cable escaping from the at least one sheave and wherein at least one optical fuse is salient from the catcher so as to be struck by the cable and to detect a derailment of the cable and/or wherein the catcher has a movable part connected to the optical fuse so as to mechanically stress the optical fuse when the movable part is struck by the cable.

6. Cable transportation installation according to claim 1, wherein the mechanical stressing of the at least one optical fuse by the cable is achieved by a direct contact made by the at least one optical fuse with the cable and severing of the at least one optical fuse by the cable.

7. Cable transportation installation according to claim 1, wherein the at least one optical fuse is arranged to detect a sheave loss or a blocked sheave, the at least one optical fuse being functionally connected to a sheave assembly of the plurality of pillars to change state when the sheave assembly rotates beyond a threshold value.

8. Cable transportation installation according to claim 1, wherein each pillar comprises:

a dispatching device supplied with electricity and connected to a control circuit via an optical line, the control circuit being configured to emit the alarm, a plurality of optical fuses connected to the dispatching device, the dispatching device containing the transmitter device and the receiver device.

9. Cable transportation installation a comprising:

a cable;

at least one optical fuse defining a first state allowing an optical signal to pass and a second state preventing the optical signal from passing, the at least one optical fuse being configured to change state between the first state and the second state when the at least one optical fuse detects at least one event on a cable, the at least one event on a cable corresponding to the at least one optical fuse mechanically stressed by the cable, the optical fuse comprising an optical fibre;

a plurality of pillars each provided with at least one sheave, the cable being arranged pressing on the at least one sheave of the plurality of pillars, at least one pillar of the plurality of pillars being provided with the at least one optical fuse;

a detection device configured to detect at least one event on a cable, the detection device making the optical signal flow through the at least one optical fuse to monitor the state of the at least one optical fuse, the detection device comprising a transmitter device configured to transmit an optical signal and a receiver device configured to receive said optical signal, the transmitter device being connected to the receiver device by the at least one optical fuse, the detection device being configured to emit an alarm in response to detection of a change of state of the at least one fuse, wherein the at least one optical fuse comprises a plurality of optical fuses connected in series on an optical line and designed so that the optical signal can flow through the plurality of optical fuses, each optical fuse being initially in the first state, wherein the detection device comprises a determination device configured to determine a position of one of the optical fuses in the second state among the optical fuses connected in series when an event on a cable has been detected.

10. Cable transportation installation according to claim 9, wherein the determination device is configured to calculate a transit time of the emitted optical signal reflected by the severed optical fibre to determine a position of the optical fuse in the second state.

11. Cable transportation installation according to claim 10, wherein the optical fuses are each connected in the optical line by means of a connector introducing at least one disturbance and wherein the determination device is configured to calculate a number of disturbances undergone by the optical signal to determine a position of the optical fuse in the second state.

12. Cable transportation installation according to claim 9, wherein the optical fuses are each connected in the optical line by means of a connector introducing at least one disturbance and wherein the determination device is configured to calculate a number of disturbances undergone by the optical signal to determine a position of the optical fuse in the second state.

13. Method for detecting an event on a cable in a cable transportation installation comprising at least the following steps:

providing a cable transportation installation comprising a cable, and a plurality of pillars each provided with at least one sheave, the cable being arranged pressing on the at least one sheave of the plurality of pillars, at least one pillar of the plurality of pillars being provided with at least one optical fuse defining a first state allowing an optical signal to pass and a second state preventing the optical signal from passing, the at least one optical fuse being configured to change state between the first state and the second state when the at least one optical fuse detects an event on the cable;

regularly transmitting a signal passing through the at least one optical fuse;

detecting absence of receipt of said signal by a receiver device and deducing therefrom a change of state of the at least one fuse representative of an event on the cable, wherein the at least one optical fuse comprises an optical fibre, wherein the optical signal is designed to pass through the at least one optical fuse, wherein the receiver device is an optical receiver device and wherein at least one optical fuse is configured to change state when said at least one optical fuse is mechanically stressed by the cable, and wherein:

each optical fuse belongs to an optical connector, the optical connectors being connected in series along the optical fibre, wherein each optical connector introduces a disturbance of the optical signal when the optical signal passes through the optical connector, the method comprising a countdown of the number of disturbances of the optical signal received to determine the number of optical connectors passed through and to evaluate the position of the optical fuse that changed state, or the optical fuses are connected in series along the optical fibre, wherein two consecutive optical fuses along the optical fibre are always separated by a threshold distance, the threshold distance corresponding to the minimum distance that exists along the optical fibre between two optical fuses and that enables a distinction to be made by a measuring device of the optical signal, determination of the optical fuse that changed state being performed by calculating the time taken to receive the signal reflected by the fuse that changed state.

14. Method for detecting an event on a cable in a cable transportation installation according to claim 13, wherein each optical fuse belongs to an optical connector, the optical connectors being connected in series along the optical fibre, wherein each optical connector introduces a disturbance of the optical signal when the optical signal passes through the optical connector, the method comprising a countdown of the number of disturbances of the optical signal received to determine the number of optical connectors passed through and to evaluate the position of the optical fuse that changed state.

15. Method for detecting an event on a cable in a cable transportation installation according to claim 13, wherein the optical fuses are connected in series along the optical fibre, wherein two consecutive optical fuses along the optical fibre are always separated by a threshold distance, the threshold distance corresponding to the minimum distance that exists along the optical fibre between two optical fuses and that enables a distinction to be made by a measuring device of the optical signal, determination of the optical fuse that changed state being performed by calculating the time taken to receive the signal reflected by the fuse that changed state.

16. Method for manufacturing a cable transportation installation comprising:

providing a cable transportation installation comprising a cable, and a plurality of pillars each provided with at least one sheave, the cable being arranged pressing on the at least one sheave of the plurality of pillars, at least one pillar of the plurality of pillars being provided with at least one electric fuse defining a first state allowing an electrical signal to pass and a second state preventing the electrical signal from passing, the at least one electric fuse being configured to change state between the first state and the second state when the at least one electric fuse is mechanically stressed by the cable, the at least one electric fuse being connected to a detection circuit by an electrically conducting cable, the detection device being configured to detect at least one event on a cable;

replacing the at least one electric fuse by an optical fuse, the at least one optical fuse defining a first state enabling an optical signal to pass and a second state preventing the optical signal from passing, the at least one optical fuse being configured to change state between the first state and the second state when the at least one optical fuse detects an event on the cable;

connecting the at least one optical fuse to the detection circuit via an optical line, wherein the detection device comprises a transmitter device configured to transmit an optical signal, a receiver device configured to receive said optical signal, the transmitter device being connected to the receiver device by the at least one optical fuse, the detection device being configured to emit an alarm in response to detection of a change of state of the at least one optical fuse of the plurality of pillars, wherein the at least one optical fuse is configured to cut an optical fibre by shearing when the at least one optical fuse is mechanically stressed by the cable, and wherein the at least one optical fuse comprises a pin fitted in movable manner to sever a loop of optical fibre when the pin is mechanically stressed by the cable and wherein the at least one optical fuse comprises the loop of optical fibre and a body defining a cavity, the loop of optical fibre being fitted inside the cavity around two attachment points separated by the pin, the at least one optical fuse being configured to detect derailment of the cable by means of the pin.

17. Method for manufacturing a cable transportation installation comprising:

providing a cable transportation installation comprising a cable, and a plurality of pillars each provided with at least one sheave, the cable being arranged pressing on the at least one sheave of the plurality of pillars, at least one pillar of the plurality of pillars being provided with at least one electric fuse defining a first state allowing an electrical signal to pass and a second state preventing the electrical signal from passing, the at least one electric fuse being configured to change state between the first state and the second state when the at least one electric fuse is mechanically stressed by the cable, the at least one electric fuse being connected to a detection circuit by an electrically conducting cable, the detection device being configured to detect at least one event on a cable;

replacing the at least one electric fuse by an optical fuse, the at least one optical fuse defining a first state enabling an optical signal to pass and a second state preventing the optical signal from passing, the at least one optical fuse being configured to change state between the first state and the second state when the at least one optical fuse detects an event on the cable;

connecting the at least one optical fuse to the detection circuit via an optical line, wherein the detection device comprises a transmitter device configured to transmit an optical signal, a receiver device configured to receive said optical signal, the transmitter device being connected to the receiver device by the at least one optical fuse, the detection device being configured to emit an alarm in response to detection of a change of state of the at least one optical fuse of the plurality of pillars, and wherein the at least one optical fuse comprises a plurality of optical fuses connected in series on an optical line and designed so that the optical signal can flow through the plurality of optical fuses, each optical fuse being initially in the first state, wherein the detection device comprises a determination device configured to determine a position of one of the optical fuses in the second state among the optical fuses connected in series when an event on a cable has been detected.

* * * * *